United States Patent Office 3,143,572
Patented Aug. 4, 1964

3,143,572
N,N'-DISUBSTITUTED-BIS(AMINOMETHYL) BENZENES
Alexander R. Surrey, Albany, N.Y., assignor to Sterling Drug Inc., New York, N.Y., a corporation of Delaware
No Drawing. Original application Oct. 8, 1959, Ser. No. 845,102. Divided and this application Sept. 29, 1961, Ser. No. 141,647
5 Claims. (Cl. 260—570.9)

This invention relates to intermediates for the preparation of compounds of the class of N,N'-di-[halogenated-(loweralkanoyl)]-diamine derivatives.

This application is a division of my copending application Serial Number 845,102, filed October 8, 1959, which is a continuation-in-part of my application Serial Number 587,937, filed May 29, 1956, copending therewith and now abandoned.

The compounds of this invention are the N,N'-disubstituted-bis(aminomethyl)benzenes of the Formula I

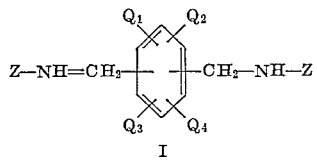

I where $Q_1$, $Q_2$, $Q_3$ and $Q_4$ are each members selected from the group consisting of H, halogen and lower-alkoxy; and Z is a member selected from the group consisting of hydroxyalkyl radicals of the formula —Y—OH and hydrocarbonoxyalkyl radicals of the formula —Y—O—R where Y is alkylene having from two to six carbon atoms and having its two free valence bonds on different carbon atoms, and R is a hydrocarbon radical having from one to eight carbon atoms. These compounds can be prepared by a variety of procedures described hereinbelow.

In the above Formula, I, $Q_1$, $Q_2$, $Q_3$ and $Q_4$ can be the same or different and when more than one represent substituents other than H, they can be in any of the available positions relative to each other. When representing halogen, $Q_1$, $Q_2$, $Q_3$ or $Q_4$ each can be chloro, bromo, iodo or fluoro; and, when representing lower-alkoxy, each can have from one to six carbon atoms, as illustrated by methoxy, ethoxy, n-propoxy, isopropoxy, n-butoxy, isobutoxy, 2-butoxy, n-pentoxy, n-hexoxy, and the like.

The xylylene moiety of the compounds of my invention, illustrated structurally by the following Formula II

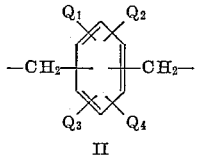

II is well known in the art in the form of xylylene dihalide derivatives and simple xylylenediamine derivatives. As shown below, these known xylylene derivatives can be used as intermediates in the preparation of compounds of the instant invention.

The alkylene radical Y in Formula I has from two to six carbon atoms and has its two free valence bonds (or connecting linkages) on different carbon atoms, as illustrated by

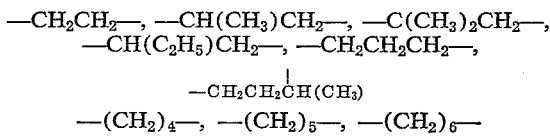

and the like.

The hydrocarbon radical in Formula I has from one to eight carbon atoms, and is, for instance, alkyl, alkenyl, alkynyl, cycloalkyl, cycloalkylalkyl, phenyl, alkylatedphenyl, benzyl or phenethyl, as further illustrated by methyl, ethyl, n-propyl, isopropyl, 2-butyl, isoamyl, n-hexyl, and the like, when alkyl; ethenyl(vinyl), 2-propenyl, 3-butenyl, 2-hexenyl, and the like, when alkenyl; 2-propynyl(propargyl), 3-hexynyl, and the like, when alkynyl; cyclopropyl, cyclobutyl, cyclopentyl, cyclohexyl, cyclooctyl, and the like, when cyclohexyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl.

The compounds of Formula I are useful as intermediates for the preparation of N,N'-bis[halogenated-(lower-alkanoyl)] - N,N'-di-Z-bis(aminomethyl)benzene derivatives. These latter compounds and said preparation are disclosed and claimed in my said copending application Serial No. 845,102.

The compounds of Formula I can be prepared by different methods, a preferred method being to react terephthalaldehyde, isophthalaldehyde or their halo or alkoxy ring substituted analogs with at least two molar equivalents of the amine of the formula Z—NH₂. The resulting bis-anil of the Formula III

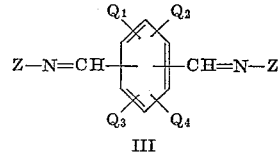

III where Z, $Q_1$, $Q_2$, $Q_3$ and $Q_4$ are defined as hereinabove for Formula I, is then catalytically reduced with hydrogen directly without isolation of the bis-anil to yield the intermediate N,N' - di - substituted - 1,4(or 1,3)-bis(aminomethyl)benzene derivative. The formation of the bis-anil is carried out preferably by heating the amine, Z—NH₂, with the terephthalaldehyde (or isophthalaldehyde) at about 50° to 150° C., usually on a steam bath, and preferably removing the water as it is formed. This reaction also can be run at room temperature using a longer reaction time. The catalytic hydrogenation of the anil is carried out using pressures of hydrogen of preferably one to three atmospheres although higher pressures can be used if desired. The hydrogenation can be run over a wide temperature range with about 25 to 60° C. being preferred; the reaction is carried out by starting at room temperature and gradually raising the temperature until the hydrogen uptake starts. Higher temperatures can be used if desired. Catalysts suitable in the hydrogenation step are those usually employed in the reduction of anils to secondary amines, e.g., palladium-on-charcoal, Raney nickel, platinum oxide, etc. Illustrative of the preparation of these intermediate N,N'-disubstituted-bis(aminomethyl)benzenes is the preparation of N,N'-bis(2-hydroxyethyl) - 1,4 - bis(aminomethyl)benzene by reacting terephthaladehyde with two molar equivalents of 2-hydroxyethylamine (ethanolamine) and reducing the resulting bis-anil by catalytic hydrogenation. Similarly prepared are: N,N' - bis(2 - ethoxyethyl) - 1,4 - bis(aminomethyl)benzene using 2-ethoxyethylamine in place of ethanolamine; N,N'-bis(2-methoxyethyl)-1,3-bis(aminomethyl)benzene using isophthalaldehyde and 2-methoxyethylamine; and N,N'-bis(2-hydroxyethyl)-1,4-bis(aminomethyl)-2,5-diethoxybenzene using 2,5-diethoxyterephthalaldehyde and 2-hydroxyethylamine. The ring substituted analogs of terephthalaldehyde and isophthalaldehyde bearing alkoxy and halo substituents are generally old in the art and can be prepared by conventional means.

Another method of preparing the compounds of Formula I is by reacting the corresponding xylylene dihalides (Formula IV), preferably the dichlorides or dibromides, with two molar equivalents of a primary amine of the formula Z—NH₂, preferably in the presence of an acid acceptor, e.g., NaOH, Na₂CO₃. This procedure is illustrated structurally as follows:

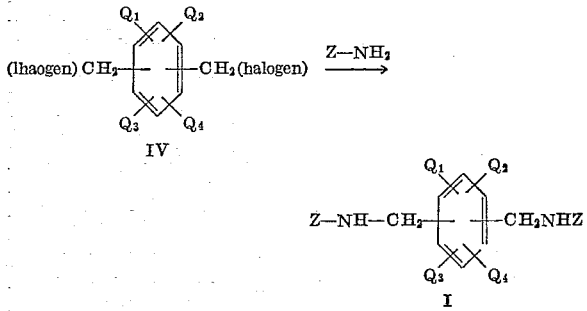

where the two halomethyl substituents are para or meta to each other, and Z, $Q_1$, $Q_2$, $Q_3$ and $Q_4$ have the meanings given above for Formula I. Illustrative of this procedure is the preparation of N,N'-(2-ethoxyethyl)-1,4-bis(aminomethyl)-2,5-dichlorobenzene by reacting 2,5-dichloro-para-xylylene dichloride [same as 1,4-bis-(chloromethyl)-2,5-dichlorobenzene] with two molar equivalents of 2-ethoxyethylamine.

Alternatively, these intermediate N,N'disubstituted-1,4- (or 1,3)-bis(aminomethyl)benzenes can be prepared stepwise by first reacting the xylylene dihalide (IV) with excess ammonia and then reacting the resulting bis(aminomethyl)benzene (V) with two molar equivalents of a halide of the formula Z-(halogen), where halogen is preferably chlorine or bromine. This procedure is illustrated structurally as follows:

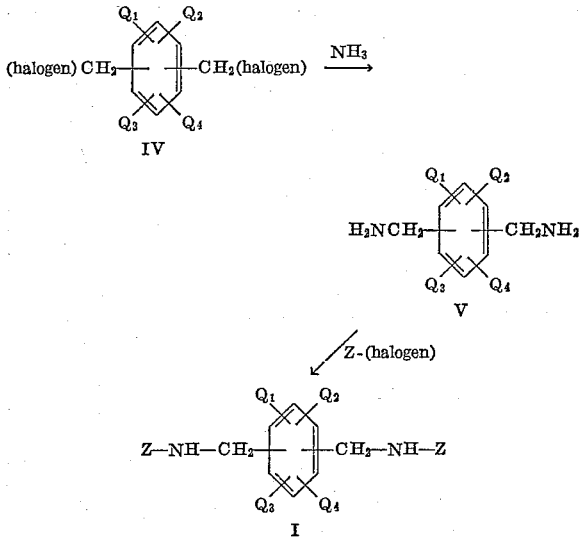

Illustrative of this procedure is the preparation of N,N'-(2-hydroxyethyl)-1,4-bis(aminomethyl)-2,5-dimethylbenzene by reacting 2,5-dimethyl-para-xylene dichloride with excess ammonia as known in the art and reacting the resulting 1,4-bis(aminomethyl)-2,5-dimethylbenzene with two molar equivalents of 2-hydroxyethyl chloride.

The chemical structures of my novel intermediate N,N'-bis(hydroxyalkyl and hydrocarbonoxyalkyl)-bis(aminomethyl)benzenes are established by the modes of syntheses and corroborated by the correspondence of calculated and found values for the elementary analyses for representative examples.

The following examples will further illustrate specific embodiments of the invention without, however, limiting it thereto.

EXAMPLE 1

*A. N,N'-Bis(Hydroxyalkyl)-Bis(Aminomethyl)Benzenes*

The preparation of these intermediates is illustrated by the following preparation of N,N'-bis(2-hydroxyethyl)-1,4-bis(aminomethyl)benzene: A mixture of 30 g. of terephthalaldehyde and 27.3 g. of ethanolamine was heated in vacuo on a steam bath for one hour. The resulting solid bis-anil was almost completely dissolved in 300 ml. of ethanol and reduced catalytically with hydrogen in the presence of palladium-on-charcoal at 50° C. After removing the catalyst by filtration, the solvent was distilled off. The solid residue was recrystallized from ethanol to give 20 g. of product melting at 127–129° C.

*Anal.*—Calcd. for $C_{12}H_{20}N_2O_2$: N, 12.47. Found: N, 11.95.

Other N,N' - bis(hydroxyalkyl)-bis(aminomethyl)benzenes that can be prepared following the above procedure using the appropriate phthalaldehyde and alkanolamine are:

N,N'-bis(3-hydroxypropyl)-1,4-bis(aminomethyl)benzene using 3-hydroxypropylamine and terephthalaldehyde,
N,N'-bis(2-hydroxypropyl)-1,4-bis(aminomethyl)benzene using 2-hydroxypropylamine and terephthalaldehyde,
N,N'-bis(4-hydroxybutyl)-1,4-bis(aminomethyl)benzene using 4-hydroxybutylamine and terephthalaldehyde,
N,N'-bis(3-hydroxypentyl)-1,3-bis(aminomethyl)benzene using 3-hydroxypentylamine and isophthalaldehyde,
N,N'-bis(6-hydroxyhexyl)-1,4-bis(aminomethyl)benzene using 6-hydroxyhexylamine and terephthalaldehyde,
N,N'-bis(2-hydroxyethyl)-1,3-bis(aminomethyl)-2,6-dimethyl-4-methoxybenzene using 2-hydroxyethylamine and 2,6-dimethyl-4-methoxyisophthalaldehyde,
N,N'-bis(2-hydroxyethyl)-1,3-bis(aminomethyl)-2-methoxy-5-chlorobenzene using 2-hydroxyethylamine and 2-methoxy-5-chloroisophthalaldehyde,
N,N'-bis(2-hydroxyethyl)-1,3-bis(aminomethyl)-4,6-dimethoxy-5-ethylbenzene using 2-hydroxyethylamine and 4,6-dimethoxy-5-ethylisophthalaldehyde,
N,N'-bis(2-hydroxyethyl)-1,3-bis(aminomethyl)-2,4,6-trimethylbenzene using 2-hydroxyethylamine and 2,4,6-trimethylisophthalaldehyde,
N,N'-bis(2-hydroxyethyl)-1,3-bis(aminomethyl)-2-ethoxy-5-bromobenzene using 2-hydroxyethylamine and 2-ethoxy-5-bromoisophthalaldehyde,
N,N'-bis(2-hydroxyethyl)-1,4-bis(aminomethyl)-2,5-diethoxybenzene using 2-hydroxyethylamine and 2,5-diethoxyterephthalaldehyde,
N,N'-bis(2-hydroxyethyl)-1,4-bis(aminomethyl)-2,5-dichlorobenzene using 2-hydroxyethylamine and 2,5-dichloroterephthalaldehyde,
N,N'-bis(2-hydroxyethyl)-1,4-bis(aminomethyl)-2,3,5-trichlorobenzene using 2-hydroxyethylamine and 2,3,5-trichloroterephthalaldehyde,
N,N'-bis(2-hydroxyethyl)-1,3-bis(aminomethyl)-2,4,6-trichlorobenzene using 2-hydroxyethylamine and 2,4,6-trichloroisophthalaldehyde,
and the like.

*B. N,N'-Bis[Halogenated - (Lower-Alkanoyl)]-N,N'-Bis-(Hydroxyalkyl)-Bis(Aminomethyl)Benzenes*

The preparation of these compounds from the claimed intermediates of the instant application is illustrated by the following preparation of N,N'-bis(dichloroacetyl)-N,N'-bis(2-hydroxyethyl)-1,4-bis(aminomethyl) benzene: A mixture of 5 g. of N,N'-bis-(2-hydroxyethyl)-1,4-bis-aminomethyl)benzene and 7.1 g. of methyl dichloroacetate was heated at 60° C. for four hours. The solid product was stirred in 40 ml. of 1 N hydrochloric acid, collected and washed with water; the yield was 8 g. After three recrystallizations from isopropyl alcohol, the product melted at 162.9–164.8° C. (corr.).

*Anal.*—Calcd. for $C_{15}H_{20}Cl_4N_2O_4$: C, 43.08; H, 4.51; Cl, 31.79. Found: C, 42.84; H, 4.91; Cl, 31.9.

The same product is obtained by reacting, preferably at a lower temperature (0° to 25° C.), N,N'-bis(2-hydroxyethyl)-1,4-bis(aminomethyl)benzene with two molar equivalents of dichloroacetyl chloride instead of methyl dichloroacetate.

N,N'-bis(dichloroacetyl)-N,N'-bis(2-hydroxyethyl)-1,4-bis(aminomethyl)benzene when administered orally to hamsters infected with *Endamoeba criceti* was found to have an $ED_{50}$ of 6.5+0.8 mg./kg./day. This compound and other N,N'-bis[halogenated-(lower-alkanoyl)]-N,N'-bis(hydroxyalkyl)bis(aminomethyl)benzenes that can be prepared following the above procedure in Example IB are disclosed and claimed in my said copending application Serial No. 845,102.

EXAMPLE 2

A. *N,N'-Bis(Hydrocarbyloxyalkyl)-Bis(Aminomethyl)-Benzenes*

The preparation of these intermediates is illustrated by the following preparation of N,N'-bis(2-ethoxyethyl)-1,4-bis(aminomethyl)benzene: Terephthalaldehyde (6.7 g.) was added in small portions with swirling and cooling in an ice bath to 8.9 g. of 2-ethoxyethylamine. The mixture was allowed to stand at room temperature for two hours, about 25 ml. of ethanol was added, and the bis anil was hydrogenated at 45° C. and 40 pounds' pressure of hydrogen using 250 mg. of palladium chloride and 2.0 g. of charcoal. After the theoretical quantity of hydrogen had been used, the catalyst was removed by filtration and the alcohol was removed by distillation in vacuo to yield N,N'-bis(2-ethoxyethyl)-1,4-bis(aminomethyl)-benzene which when treated with ethanolic hydrochloric acid and ether gave 6.5 g. of the crystalline product as its dihydrochloride, M.P. over 250° C. A sample was recrystallized from ethanol for analysis.

*Anal.*—Calcd. for $C_{16}H_{28}N_2O_2 \cdot 2HCl$: Cl⁻, 20.07. Found: Cl⁻, 19.93.

Following the above procedure using isophthalaldehyde in place of terephthalaldehyde, the resulting product is N,N'-bis(2-ethoxyethyl)-1,3-bis(aminomethyl)benzene.

Other N,N'-bis(hydrocarbyloxyalkyl) - 1,4-bis(aminomethyl)benzenes that can be prepared according to the above procedure using the appropriate hydrocarbyloxyalkylamine in place of 2-ethoxyethylamine are: N,N'-bis(3-isopropoxypropyl)-1,4-bis(aminomethyl)-benzene using 3-isopropoxypropylamine, N,N'-bis(2-methoxyethyl)-1,4-bis(aminomethyl)benzene using 2-methoxyethylamine, N,N'-bis(2-n-hexoxyethyl)-1,4-bis(aminomethyl)benzene using 2-n-hexoxyethylamine, N,N'-bis(6-methoxyhexyl)-1,4-bis(aminomethyl)benzene using 6-methoxyhexylamine, N,N'-bis(2-ethoxypropyl)-1,4-bis(aminomethyl)benzene using 2-ethoxypropylamine, N,N'-bis(2-cyclohexoxyethyl)-1,4-bis(aminomethyl)benzene using 2-cyclohexoxyethylamine, N,N'-bis[2-(1-propenoxy)ethyl]-1,4-bis(aminomethyl)benzene using 2-(1-propenoxy)ethylamine, N,N'-bis[2 - (cyclopentylmethoxy)ethyl]-1,4-bis(aminomethyl)benzene using 1-(cyclopentylmethoxy)ethylamine, N,N'-bis(2 - phenoxyethyl) - 1,4-bis(aminomethyl)benzene using 2-phenoxyethylamine, N,N'-bis(2-benzyloxyethyl)-1,4-bis(aminomethyl)benzene using 2-benzyloxyethylamine, N,N'-bis[2-(para-tolyloxy)ethyl]-1,4-bis(aminomethyl)benzene using 2-(para-tolyloxy)ethylamine, N,N'-bis[2 - (2-phenylethoxy)ethyl]-1,4-bis(aminomethyl)benzene using 2-(2-phenylethoxy)ethylamine, and the like.

Other N,N'-bis(hydrocarbyloxyalkyl)-bis(aminomethyl)-benzenes that can be prepared according to the above procedure using molar equivalent quantities of the appropriate reactants are: N,N'-bis(2-ethoxyethyl)-1,3-bis(aminomethyl)-2-methoxy-5-chlorobenzene using 2-methoxy-5-chloroisophthalaldehyde and 2-ethoxyethylamine, N,N'-bis(2 - ethoxyethyl) - 1,3 - bis(aminomethyl)-4,6-dimethoxy-5-ethylbenzene using 4,6-dimethoxy-5-ethylisophthalaldehyde and 2-ethoxyethylamine, N,N'-bis(2-ethoxyethyl)-1,3-bis(aminomethyl) - 2,4,6- trimethylbenzene using 2,4,6-trimethylisophthalaldehyde and 2-ethoxyethylamine, N,N'-bis(2-ethoxyethyl) - 1,4-bis(aminomethyl)-2,5-dichlorobenzene using 2,5-dichloroterephthalaldehyde and 2-ethoxyethylamine, N,N'-bis(2-ethoxyethyl)-1,4-bis-(aminomethyl)2,3,5-trichlorobenzene using 2,3,5-trichloroterephalaldehyde and 2-ethoxyethylamine, and the like.

B. *N,N'-Bis[Halogenated-(Lower-Alkanoyl)] - N,N'-Bis-(Hydrocarboxyalkyl)-Bis(Aminomethyl)Benzenes*

The preparation of these compounds from the claimed intermediates of the instant application is illustrated by the following preparation of N,N'-bis(dichloroacetyl)-N,N'-bis(2-ethoxyethyl) - 1,4- bis(aminomethyl)benzene: A mixture of 6.0 g. of N,N'-bis(2-ethoxyethyl)-1,4-bis-(aminomethyl)benzene dihydrochloride dissolved in 14 ml. of water, 30 ml. of 10% sodium hydroxide, and 45 ml. of ethylene dichloride was stirred in a flask placed in an ice bath. To the cold mixture was added dropwise over the course of one-half hour 5.5 g. of dichloroacetyl chloride dissolved in 25 ml. of ethylene dichloride. Stirring was continued for an additional ten minutes; the organic layer was separated and washed first with 5% aqueous sodium hydroxide and then with 5% aqueous hydrochloric acid and finally with water. Evaporation in vacuo gave a solid which was recrystallized from ethanol to yield 4.5 g. of crystalline product, N,N'-bis-(dichloroacetyl)-N,N'-bis(2 - ethoxyethyl)-1,4-bis(aminomethyl)benzene, M.P. 137.6–143.9° C. (corr.) when recrystallized from ethanol.

*Anal.*—Calcd. for $C_{20}H_{28}Cl_4N_2O_4$: C, 47.82; H, 5.62; Cl, 28.23. Found: C, 47.77; H, 5.68; Cl, 28.19.

N,N'-bis(dichloroacetyl) - N,N'-bis(2-ethoxyethyl)-1,4-bis(aminomethyl)benzene when administered orally to hamsters infected with *Endamoeba criceti* was found to have an $ED_{50}$ of 1.14±0.10 mg./kg./day. This compound was found to have an approximate acute oral toxicity ($ALD_{50}$) in mice of greater than 8,000 mg./kg. This compound and other N,N'-bis[halogenated-(lower-alkanoyl)] - N,N'- bis (hydrocarbyloxyalkyl) bis (aminomethyl)benzenes are disclosed and claimed in my copending application Serial No. 845,102.

I claim:

1. An N,N'-disubstituted-bis(aminomethyl)benzene of the formula

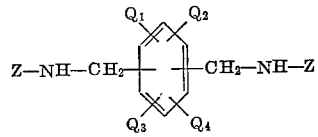

selected from the group consisting of 1,4-bis(Z-aminomethyl)benzenes and 1,3-bis(Z-aminomethyl)benzenes wherein $Q_1$, $Q_2$, $Q_3$ and $Q_4$ are each members selected from the group consisting of H, halogen and lower-alkoxy; and Z is a member selected from the group consisting of hydroxyalkyl radicals of the formula —Y—OH and hydrocarbonoxyalkyl radicals of the formula —Y—O—R where Y is alkylene having from two to six carbon atoms and having its two free valence bonds on different carbon atoms and R is a hydrocarbon radical having from one to eight carbon atoms.

2. An N,N'-bis(hydroxyalkyl)-1,4-bis(aminomethyl) benzene of the formula

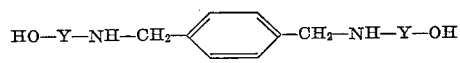

where Y is alkylene having from two to six carbon atoms and having its two free valence bonds on different carbon atoms.

3. An N,N'-bis(2-alkoxyethyl)-1,4-bis(aminomethyl)benzene of the formula
where R is alkyl having from one to eight carbon atoms.
4. N,N'-bis(2-hydroxyethyl)-1,4-bis(aminomethyl)benzene.
5. N,N'-bis(2-ethoxyethyl)-1,4-bis(aminomethyl)benzene.
References Cited in the file of this patent
UNITED STATES PATENTS
| | | |
|---|---|---|
| 2,604,399 | Donovan et al. | July 22, 1952 |
| 2,790,830 | Bader | Apr. 30, 1957 |
| 2,959,618 | Kyrides | Nov. 8, 1960 |

UNITED STATES PATENT OFFICE
CERTIFICATE OF CORRECTION

Patent No. 3,143,572                                  August 4, 1964

Alexander R. Surrey

It is hereby certified that error appears in the above numbered patent requiring correction and that the said Letters Patent should read as corrected below.

Column 1, lines 21 to 27, Formula 1, the left-hand portion of the formula reading:

$Z-NH=CH_2-$         read         $Z-NH-CH_2-$ column 3, lines 6 to 13, formula IV, for the left-hand portion of the formula reading:

(lhaogen)$CH_2-$         read         (halogen)$CH_2-$ line 63, for "2,5-dimethyl-para-xylene" read -- 2,5-dimethyl-para-xylylene --; column 4, line 70, for "aminomethyl)" read -- (aminomethyl) --; column 5, line 1, for "$C_{15}H_{20}Cl_4N_2O_4$:" read -- $C_{16}H_{20}Cl_4N_2O_4$: --; line 60, for "1-(cyclopentylmethoxy)" read -- 2-(cyclopentylmethoxy) --.

Signed and sealed this 12th day of January 1965.

(SEAL)
Attest:

ERNEST W. SWIDER                                  EDWARD J. BRENNER
\ttesting Officer                                     Commissioner of Patents